United States Patent Office 3,470,175
Patented Sept. 30, 1969

3,470,175
UREIDOMETHYLENEHYDROTRIAZINEDIONE
Robert A. Wiesboeck, Atlanta, Ga., assignor, by mesne assignments, to USS Agri-Chemicals, Inc., Pittsburgh, Pa., a corporation of Delaware
No Drawing. Filed Apr. 26, 1966, Ser. No. 545,234
Int. Cl. C07d 55/12; C05c 11/00
U.S. Cl. 260—248                                  1 Claim

ABSTRACT OF THE DISCLOSURE

Hydrotriazinedione derivatives including

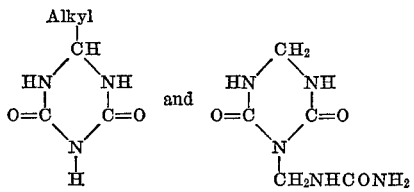

are disclosed as well as a method of employing these compounds to fertilize soil. The compounds are slow release nitrogen fertilizers.

---

This invention relates to slow release nitrogen fertilizers and methods of preparation thereof.

Most slow release nitrogen fertilizers are prepared as urea-formaldehyde condensation products. The release rate of the polymers in such products is inversely proportional to the molecular size, the most desirable rate being found with polymers containing from four to eight urea units per molecule. Polymers of higher chain lengths rapidly become unavailable, resulting in poor efficiency as fertilizer materials. Since the condensation reaction of urea with formaldehyde cannot be controlled well enough to prevent the formation of such highly polymeric materials, approximately one-third of the total nitrogen content becomes fixed and cannot be utilized by the plant.

The key characteristic of the slowly available nitrogen in urea-formaldehyde products has been expressed as the "availability index of cold water-insoluble nitrogen." The analytical method for the "Nitrogen Activity Index (AI) of Urea-Formaldehyde Compounds" is given in the Official Methods of Analysis of the Association of Official Agricultural Chemists, tenth edition (1965), p. 19. The AI is calculated by the following equation:

Activity Index (AI) = (% CWIN − % HWIN) × 100/% CWIN where

CWIN = cold water (25±2° C.) insoluble nitrogen
HWIN = hot water insoluble nitrogen An inherent advantage gained by higher AI values is that the nitrogen content, which is fixed or unavailable, is reduced proportionally as the AI value increases. Instead of ureaform products having less than 50 AI, it is desirable that the AI be increased substantially thereabove and preferably as high as 100.

I have discovered that hydrotriazinedione and the N- and C-substituted dione compounds thereof can be effectively utilized as slow release nitrogen fertilizer compounds. When applied to the ground in which the plants are growing, it is found that the nitrogen is essentially entirely available as a plant nutrient. The compounds are chemically uniform, low molecular weight compounds, and are substantially free of highly polymeric material so that they are very effectively utilized by plants.

In an illustrative embodiment of the invention, hydrotriazinedione is prepared by heating methylenediurea under ambient atmospheric conditions, utilizing an air sweep to remove the volatilized ammonia. I prefer to heat the methylenediurea at a temperature of 150–200° C. in a rotating flask until a weight loss of about 13 percent is reached, at which time cyclization is essentially completed, adjusting the temperature initially so that melting of the substrate is prevented. The pyrolysis is essentially complete within about 4 to 6 hours. The product can be recrystallized by dissolving it in boiling water and evaporating the solution until crystals appear which are recovered by filtration.

The growth response to hydrotriazinedione, as a source of nitrogen, is demonstrated in Table I. The compound was applied at 1 and 2 lbs. N per 1,000 sq. ft. on established rye grass, with supplementary phosphorus and potassium. The results are listed as the average yields of air-dried plant material obtained in three parallel tests:

TABLE I.—GREENHOUSE EVALUATION OF HYDROTRIAZINEDIONE

| Crop No. | Yield, g. | | |
|---|---|---|---|
| | 0 lb. N | 1 lb. N | 2 lb. N |
| 1 | 0.48 | 0.43 | 0.47 |
| 2 | 0.48 | 0.40 | 0.38 |
| 3 | 0.30 | 0.30 | 0.32 |
| 4 | 0.22 | 0.32 | 0.37 |
| 5 | 0.17 | 0.39 | 0.39 |
| 6 | 0.11 | 0.28 | 0.30 |
| 7 | 0.08 | 0.25 | 0.25 |
| 8 | 0.03 | 0.17 | 0.22 |
| 9 | 0.00 | 0.20 | 0.23 |
| Total | 1.87 | 2.74 | 2.93 |

Methylenediurea is a compound which is prepared from urea and formaldehyde by known procedures. Heating the methylenediurea (II) leads to the elimination of ammonia and formation of hydrotriazinedione (I), the general reaction being as follows:

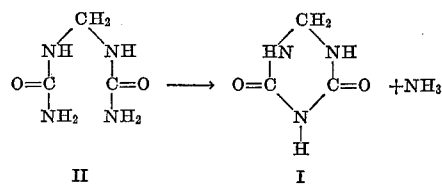

The ring formation of methylenediurea on heating is a general reaction and occurs also with N- or C-substituted methylenediureas such as dimethylenetriurea or isobutylidene-diurea. The resulting pyrolysis product is an N-substituted hydrotriazinedione (III) in the case of dimethylenetriurea, and C-substituted hydrotriazinedione (IV) in the case of isobutylidenediurea.

The pyrolysis reaction for these derivatives is as follows:

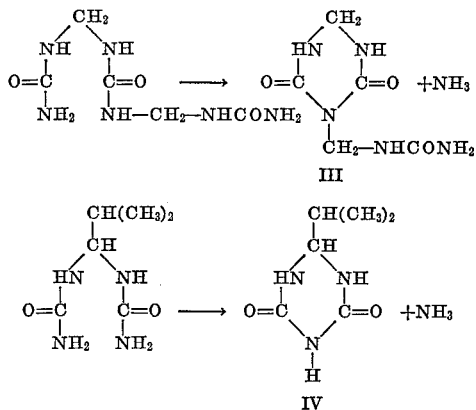

Suitable substituents on the carbon atom are alkyl groups such as methyl, ethyl, propyl, isopropyl, etc.

I have also discovered that the C-substituted hydrotriazinedione can be prepared by a pyrolysis of alkylol biuret. In this case the intermediate (V) is obtained by reacting biuret with the desired aldehyde at a 1:1 mole ratio, in weakly alkaline medium.

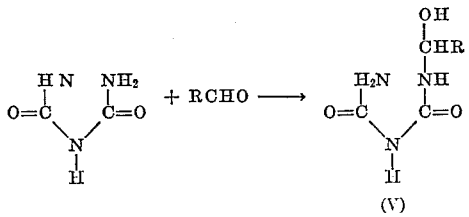

Subsequent heating to 150–200° C. leads to ring formation and elimination of water, giving hydrotriazinedione or a C-substituted hydrotriazinedione depending on the aldehyde used.

In both cases, the pyrolysis reaction can be carried out in an inert liquid such as n-hexyl ether, or simply by heating the substrate in the dry state to 150–200° C. (preferably 190° C.) until cyclization is essentially completed. Conducting the pyrolysis in a rotating vessel offers the advantage of producing spherical particles resembling prilled materials.

The hydrotriazinediones described here are characterized by high cold water insolubilities, yet are hot water soluble. For example, hydrotriazinedione contains 36.5% nitrogen, of which 74.2% is cold water insoluble, yet practically all soluble in hot water. Accordingly, these compounds make highly efficient N-fertilizer materials.

Specific examples illustrative of the invention may be set out as follows:

EXAMPLE I

One mole of methylenediurea (132 g.) is heated to 195° C. in a rotating flask until a weight loss of 13% is reached. Depending on the purity of the starting material, the temperature has to be adjusted initially so that melting of the substrate is prevented. The pyrolysis is essentially complete within 4–6 hours. The product can be recrystallized from 40 parts of boiling water by evaporating the filtered solution until crystals appear. Subsequent storage for 24 hours at room temperature or below produces nearly white crystals which decompose at 300–305° C. without melting. The product has the following analysis:

| | Percent |
|---|---|
| Total N | 36.7 |
| CWIN | 27.1 |
| HWIN | 0.03 |
| AI | 99.8 |

EXAMPLE II

The process was carried out as described in Example I except that instead of one mole of methylene-diurea (132 g.), there is employed one mole of alkylol biuret (133 g.). The product, hydrotriazinedione, was the same as that prepared in Example I.

EXAMPLE III

Pyrolysis of one mole of isobutylidenediurea (174 g.) according to the procedure outlined in the preceding example produces 155 g. crude isopropylhydrotriazine-dione which is washed with acetone and recrystallized from boiling water. The recrystallized compound, isopropylhydrotriazinedione, decomposes at 320° C. without melting, and has the following analysis:

| | Percent |
|---|---|
| Total N | 27.0 |
| CWIN | 16.2 |
| HWIN | 0.01 |
| AI | 99.9 |

EXAMPLE IV

One mole of dimethylenetriurea (204 g.) is heated as described in Example I at 160° C. and yields 280 grams of crude ureidomethylenehydrotriazinedione. The compound is purified by recrystallization from hot water, followed by concentration of the solution under vacuum. The melting point, with decomposition, is 254–260° C. The product has the following analysis:

| | Percent |
|---|---|
| Total N | 37.5 |
| CWIN | 26.2 |
| HWIN | 0.4 |
| AI | 98.7 |

The compounds described above are highly useful as nutrients for plant growth having high AI values, while at the same time being utilized as slowly available nitrogen fertilizers. As indicated by the analysis, the nitrogen is essentially entirely available as a plant nutrient.

The foregoing products, as will be obvious to those skilled in the art, may be incorporated in mixed fertilizers containing supplemental rapidly-available nitrogen sources, conventional $P_2O_5$ and $K_2O$ sources, and other nutrient materials necessary for plant growth.

While in the foregoing specification I have set out embodiments of the invention in considerable detail for the purpose of illustrating the invention, it will be understood that such details may be varied widely by those skilled in the art without departing from the spirit of my invention.

I claim:
1. As a new composition of matter, ureidomethylenehydrotriazinedione.

References Cited

UNITED STATES PATENTS

| 3,035,055 | 5/1962 | Slezak et al. | |
| 3,040,044 | 6/1962 | Hirsch et al. | |
| 3,322,528 | 5/1967 | Hamamoto et al. | 71—28 |

OTHER REFERENCES

Terman, et al., Crop Response to Urea and Urea Pyroltsis Products, J. Agr. & Food Chem., 12. No. 2, 151–4, (1964).

S. LEON BASHORE, Primary Examiner

T. G. FERRIS, Assistant Examiner

U.S. Cl. X.R.

71—1, 28, 54